United States Patent

McCorry et al.

[11] Patent Number: 5,851,626
[45] Date of Patent: Dec. 22, 1998

[54] VEHICLE ACOUSTIC DAMPING AND DECOUPLING SYSTEM

[75] Inventors: Richard McCorry, Walled Lake; Michael Dinsmore, Troy, both of Mich.

[73] Assignee: Lear Corporation, Southfield, Mich.

[21] Appl. No.: 841,999

[22] Filed: Apr. 22, 1997

[51] Int. Cl.⁶ ............................. B32B 3/02; B60J 5/00
[52] U.S. Cl. ................. 428/95; 428/178; 181/288; 181/290; 296/146.7; 296/211
[58] Field of Search ............... 181/286, 290; 428/178, 188, 95, 175, 34.4; 296/146.7, 211

[56] References Cited

U.S. PATENT DOCUMENTS

| | | | |
|---|---|---|---|
| 3,196,315 | 7/1965 | Peterson | 317/2 |
| 3,199,481 | 8/1965 | Handwerker | 112/420 |
| 3,561,177 | 2/1971 | Agro et al. | 52/177 |
| 3,813,279 | 5/1974 | Vovuer | 428/178 |
| 4,037,013 | 7/1977 | Sprague | 428/310 |
| 4,807,394 | 2/1989 | Lyon | 47/79 |

FOREIGN PATENT DOCUMENTS

| | | |
|---|---|---|
| 73919 | 3/1983 | European Pat. Off. . |
| 2381500 | 9/1978 | France . |
| 1131627 | 2/1989 | Japan . |
| 639972 | 6/1994 | Japan . |

*Primary Examiner*—Donald Loney
*Attorney, Agent, or Firm*—Brooks & Kushman P.C.

[57] ABSTRACT

A vehicle acoustic system is attachable over a vehicle interior sheet metal component. The system includes a bubble pack which has a first film layer and a second film layer secured to the first film layer, wherein the first and second film layers cooperate to form a plurality of pockets therebetween. The pockets include a gas disposed therein, such that the pockets are at least partially compressible. The bubble pack is adapted to be positioned in direct contact with the sheet metal component. The gas disposed in the pockets could be air or any other lightweight gas. A plurality of kinetic energy dissipating granules may be disposed within the pockets for enhanced noise isolation. Alternatively, damping liquids or gels may be disposed in the pockets. Various embodiments are described.

7 Claims, 3 Drawing Sheets

VEHICLE ACOUSTIC DAMPING AND DECOUPLING SYSTEM

TECHNICAL FIELD

The present invention relates to a vehicle acoustic damping and decoupling system for isolation of airborne and structure-borne noise adjacent vehicle sheet metal components.

BACKGROUND OF THE INVENTION

Typically, vehicle acoustic damping and decoupling systems are provided for isolating airborne and structure-borne noise in a vehicle. Airborne noise is generally a result of road noise, tire noise, engine noise, etc. which may pass through a vehicle body into the passenger compartment. Structure-borne noise is generally vibrational noise which is translated from the suspension and vibration of the engine to the interior sheet metal, which creates noise when vibrating in certain frequency ranges.

A typical prior art vehicle acoustic damping and decoupling system is shown in FIG. 1 for isolation of both structure-borne and airborne noise. As shown, the system usually comprises a carpet 10 secured to a barrier layer 12. The barrier layer 12 is typically an EVA material which includes dense filler material disposed therein for sound deadening. The barrier layer 12 is positioned on a decoupler layer 14, which provides additional acoustic absorption as well as decoupling of the barrier layer 12. Generally, an asphaltic damper 16 is bonded to the sheet metal 18. The asphaltic damper 16 absorbs some of the vibrational energy of the sheet metal, and converts it to heat for dissipation.

The decoupler layer 14 acts as a soft spring between the asphaltic damper 16 and barrier layer 12. In this manner, the decoupler 14 decouples the sheet metal 18 and asphaltic damper 16 from the barrier layer 12 for improved isolation of noise.

Such prior art assemblies pose an array of problems. For example, the asphaltic damper 16 is typically baked onto the sheet metal layer 18. This creates recycling problems because it is difficult to separate the asphaltic damper 16 from the sheet metal 18. The asphaltic damper 16 is also a heavy component which is undesirable in vehicles, it requires a labor-intensive assembly process, and its noise-isolating characteristics are variable depending upon temperature. Additionally, the asphaltic damper 16 is typically installed prior to painting, and such dampers can drag undesirable dirt into painting clean rooms.

The decoupler layer 14 can also be problematic in that it is typically an organic material which decomposes when wet, which may result in foul smells. It is also difficult to manufacture within tight thickness tolerances, and generally not recyclable. Molded underpads also provide many of the same problems as the non-molded underpads. Additionally, such molded underpads are cycle time-intensive, tooling-intensive, and are generally expensive to manufacture and assemble.

One effort to overcome the above-referenced shortcomings of prior art vehicle acoustic damping and decoupling systems is a Volkswagen system which uses individual PVC packs, 100% filled with sand. However, because the individual packs are 100% filled sand, no decoupling function is provided. Additionally, this system is very heavy because of the amount of sand.

Accordingly, it is desirable to provide a vehicle acoustic damping and decoupling system which effectively reduces structure-borne and airborne noise in a manner which reduces manufacturing costs and enhances recycling capabilities, while reducing part weight and eliminating other prior art problems described above.

DISCLOSURE OF THE INVENTION

The present invention overcomes the above-reference shortcomings of prior art assemblies by providing a vehicle acoustic damping and decoupling system which comprises a bubble pack which forms pockets therein, wherein the bubble pack is positioned against vehicle sheet metal, such as underneath a floor covering or trunk liner or in the engine compartment for acoustic treatment. Preferably, the bubble pack is positioned between the carpet barrier layer and the sheet metal for acoustic damping and decoupling. The compressible nature of the pockets provides enhanced decoupling of the carpet barrier layer from the sheet metal, while also providing a thermal insulation. This invention provides the possibility of enhancing noise isolation by providing various materials, gases, or fluids within the pockets, while providing a substantial weight reduction and enhancing recyclability.

In a preferred embodiment, the bubble pack pockets are each partially filled with a plurality of kinetic energy dissipating granules. Such granules are highly effective in dissipating vibrational energy from the sheet metal. By only partially filling the pockets, the decoupling function of the bubble pack is unaffected, and a thermal advantage is achieved. By selecting a thermoplastic material for the bubble pack and for the granules, recyclability of the acoustic system may be achieved. Also, this configuration substantially reduces weight in comparison to prior art assemblies.

The present invention also provides the possibility of using lightweight, compressible gases within the bubble pockets. Alternatively, acoustic damping fluids could also be used.

Accordingly, an object of the present invention is to provide an improved vehicle acoustic damping and decoupling system in which airborne and structure-borne noise is dissipated, decoupling is accomplished, and thermal insulation is achieved in a recyclable acoustic system.

A further object of the present invention is to provide an improved vehicle damping and decoupling system in which manufacturing costs and part weight are reduced.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 4 shows a schematic sectional view of a vehicle damping and decoupling system in accordance with the embodiment shown in FIG. 3;

DETAILED DESCRIPTION OF THE PREFERRED EMBODIMENTS

Figure 2:
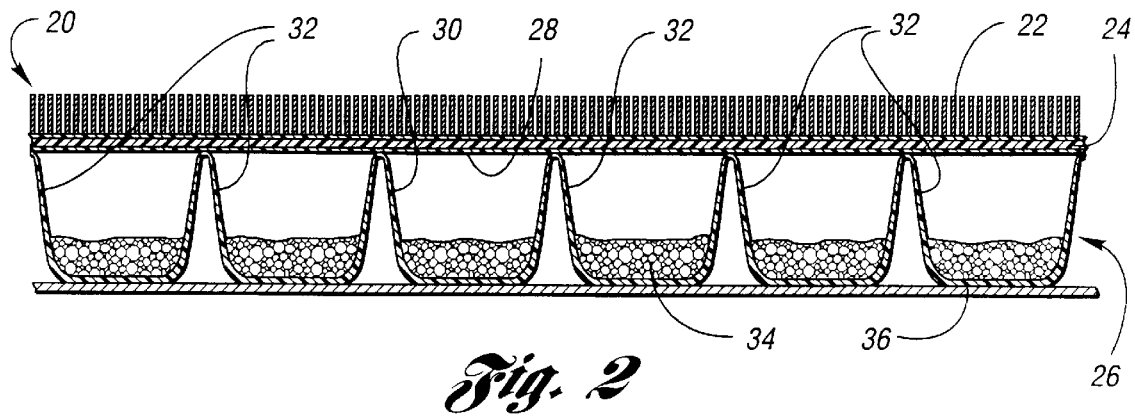
FIG. 2 shows a schematically arranged sectional view of a vehicle damping and decoupling system in accordance with a first embodiment of the present invention.

Referring to FIG. 2, a first embodiment of a vehicle damping and decoupling system 20 is shown in accordance with the present invention. This system 20 comprises a carpet 22 disposed on a barrier 24. The barrier 24 could be any of a number of materials, such as EVA, PVC, EPDM, polypropylene, bitumen, or Ecoplus™. Alternatively, the barrier 24 could be a coating, such as latex, polyethylene, ABS, etc.

A bubble pack 26 is positioned against the barrier 24, and comprises first and second film layers 28, 30 which cooperate to form a plurality of pockets 32 therebetween. The pockets 32 comprise a gas disposed therein such that the pockets are at least partially compressible. The bubble pack film layers 28, 30 could be any variety of materials, such as thermoplastic (surlyn, PVC, polypropylene, EVA, etc.), or thermoset sheets (rubber, SBR, EPDM, etc.) In the embodiment illustrated in FIG. 2, each pocket 32 comprises a plurality of kinetic energy dissipating granules 34 disposed therein. The granules 34 will generally comprise a weight which can be as low as 0.5% the weight of existing damper systems, particularly if glass microspheres are used. This provides a substantial advantage to manufacturers. Additionally, by using polymeric materials such as polyethylene as the preferred material for the granules, recycled drink containers can be used in manufacturing the granules 34.

Figure 1:
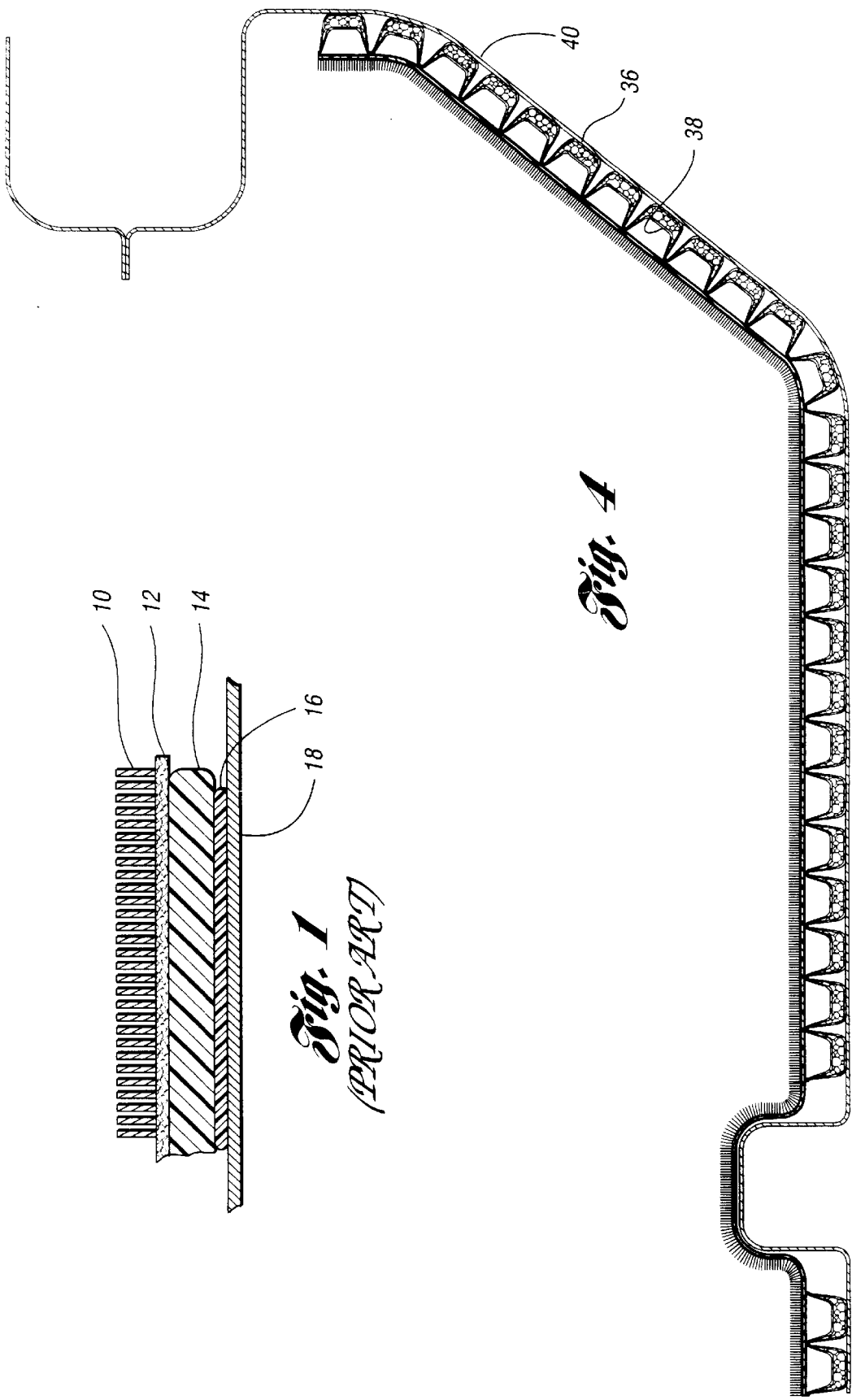
FIG. 1 shows a schematically arranged sectional view of a typical prior art vehicle damping and decoupling system.

Preferably, each pocket 32 is only partially filled with granules 34 so that the pockets 32 maintain their compressibility, which allows decoupling of the sheet metal 36 from the barrier layer 24. The second film layer 30 of the bubble pack 26 is positioned in direct contact with the sheet metal 36, thereby eliminating the damper layer used in prior art assemblies (damper 16 of FIG. 1).

The bubble pack 26 of the present invention could comprise only gas-filled pockets 32, or could be partially filled with granules 34. The granules 34 could comprise any damping materials, such as glass microspheres, sand, silica, granular bitumen, asphaltic materials, LDPE granules, damping foams, etc. The level of fill of the pockets could vary, but the preferred granular fill is around 25%.

The granules 34 will typically be deposited into the pockets 32 wherein one film layer has been configured to form the pockets. Any excess granules will then be removed, and the other film layer will be applied over the top to enclose the pockets. A heat-activated adhesive would preferably be used for securing the bubble pack to the barrier layer 12. Alternatively, the bubble pack could be integrally molded with the barrier layer 12.

Figure 3:
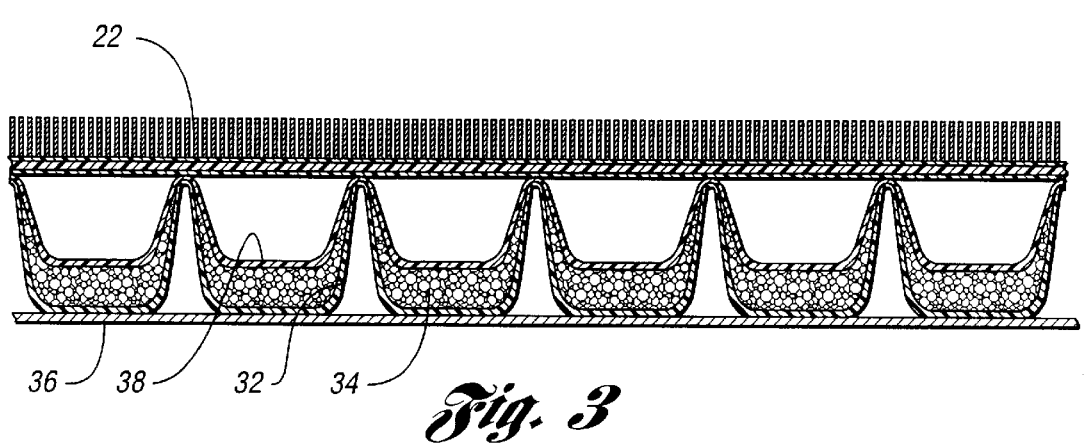
FIG. 3 shows a schematically arranged sectional view of a vehicle damping and decoupling system in accordance with a second embodiment of the present invention.

Turning to FIGS. 3 and 4, a second embodiment of the present invention is shown. This embodiment is in all other respects identical to that shown in FIG. 2, except that an extra film layer 38 is provided in a manner such that the pockets 32 are configured to contain the granules 34 away from the barrier layer 24 and closely adjacent the sheet metal 36. This embodiment is particularly advantageous in vertical or angled sheet metal wall areas, such as the angled wall 40 shown in FIG. 4. In this configuration, the granules 34 are maintained against the angled wall 40 of the sheet metal 36 for vibrational energy dissipation, and the compressibility of the pockets 32 is maintained for decoupling purposes.

Figure 5:
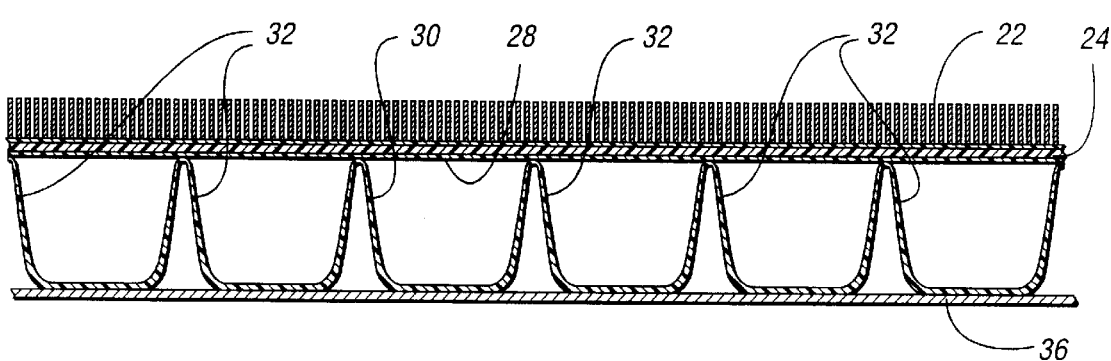
FIG. 5 shows a schematically arranged sectional view of a vehicle damping and decoupling system in accordance with a third embodiment of the present invention.

Turning to FIG. 5, a third embodiment of the present invention is shown. In this embodiment, the vehicle acoustic damping and decoupling system is in all other respects identical to the embodiment shown in FIG. 2, except that the granules 34 have been removed. In this embodiment, the pockets 32 are merely filled with either air or a lightweight gas for decoupling, noise isolation, and thermal insulation. The lightweight gases could be hydrogen, helium, etc. The advantage of a lighter weight gas would be lower compression modulus and therefore better decoupling function.

Figure 6:
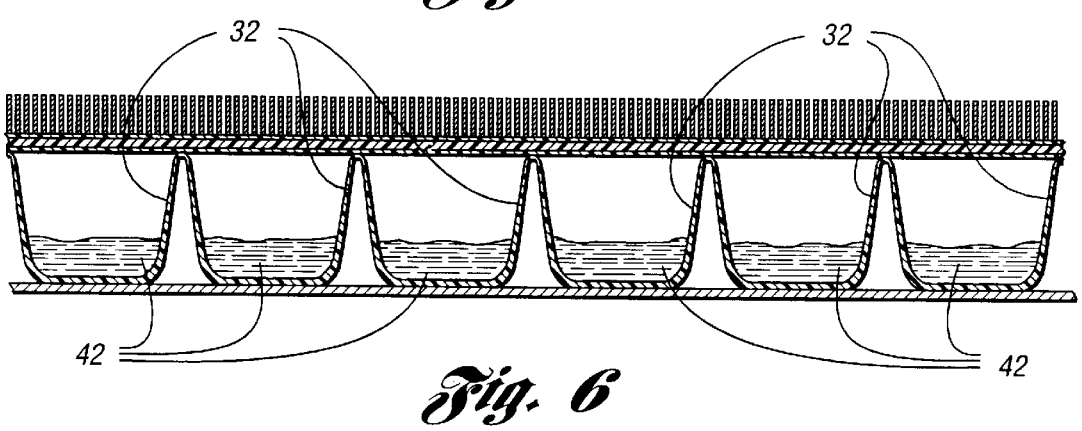
FIG. 6 shows a schematically arranged sectional view of a vehicle damping and decoupling system in accordance with a fourth embodiment of the present invention.

The embodiment shown in FIG. 6 shows the pockets 32 filled with an acoustic damping fluid 42. The lightweight liquid damping fluid could, for example, comprise electrorheological fluids manufactured by RheoActive Corporation, or magneto-resistive fluid manufactured by Lord Corporation. Alternatively, a damping liquid or gel could be used.

Figure 7:
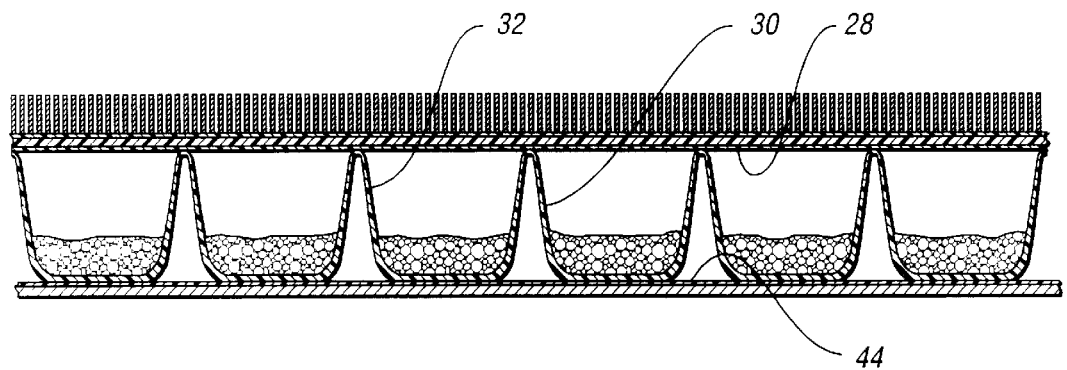
FIG. 7 shows a schematically arranged sectional view of a vehicle damping and decoupling system in accordance with a fifth embodiment of the present invention.

Turning to FIG. 7, a fifth embodiment of the present invention is shown. This embodiment is in all other respects identical to that shown in FIG. 2, except that an extra film layer 44 is added. This extra film layer 44 adds structural integrity to the bubble pack 26, which may help prevent spillage of granules or liquid disposed within the pockets 32.

Figure 8:
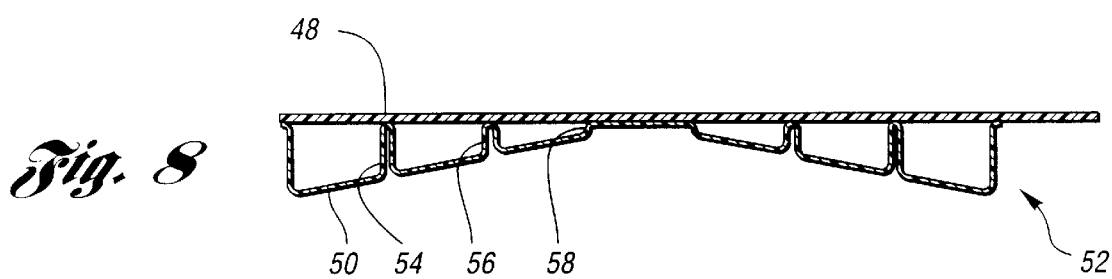
FIG. 8 shows a schematically arranged sectional view of a bubble pack in accordance with a sixth embodiment of the present invention.

Referring to FIG. 8, a sixth alternative embodiment of the present invention is shown. In this embodiment, the first and second film layers 48, 50 of the bubble pack 52 form pockets 54, 56 and 58 of varying height and bottom angle to create a variable thickness assembly for packaging and improved local decoupling (acoustic insulation) performance.

Figure 9A:
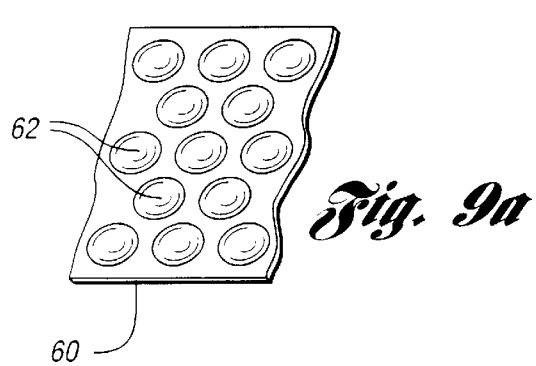
FIGS. 9a–9d illustrate various pocket configurations for use in accordance with the present invention.
Figure 9B:
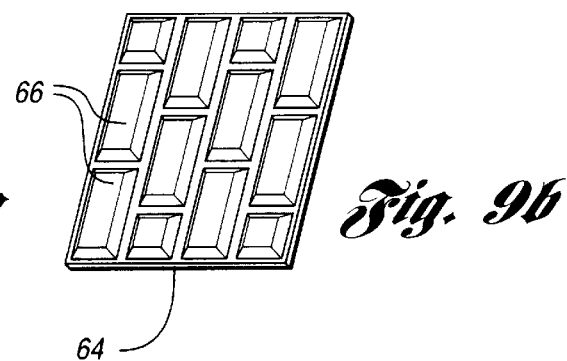
Figure 9C:
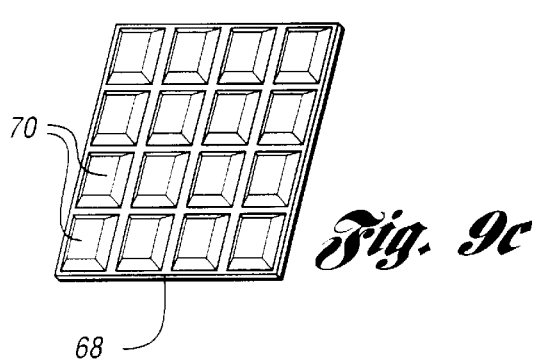
Figure 9D:
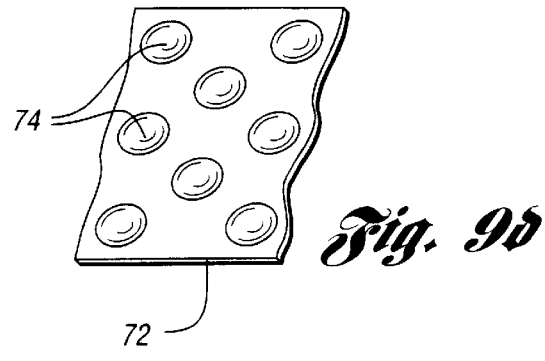

Finally, turning to FIGS. 9a–9d, various bubble pocket embodiments are shown. FIG. 9a illustrates a bubble pack 60 with round pockets 62 formed therein. FIG. 9b illustrates a bubble pack 64 with rectangular pockets 66. FIG. 9c illustrates a bubble pack 68 with square pockets 70. FIG. 9d shows a bubble pack 72 with spaced apart round pockets 74. By vacuum forming or blow-molding the film layers to form the respective pockets, manufacturing flexibility is achieved, because any variety of pockets configurations may be accomplished.

Accordingly, with the present invention, the fiber or foam decoupler and damper layer of the prior art are eliminated, and many advantages are achieved, such as weight reduction, improved noise dissipation and isolation, improved recyclability, reduced manufacturing costs, etc.

While the best modes for carrying out the invention have been described in detail, those familiar with the art to which this invention relates will recognize various alternative designs and embodiments for practicing the invention within the scope of the appended claims.

What is claimed is:

1. A vehicle acoustical system for attachment over a vehicle interior sheet metal component, comprising:

a carpet layer;

a sound barrier layer secured to the carpet layer; and a bubble pack comprising a first film layer and a second film layer secured to the first film layer, said first and second film layers cooperating to form a plurality of pockets therebetween, said pockets comprising a gas disposed therein such that the pockets are substantially compressible, said pockets including not more than approximately 25% by volume kinetic energy dissipating granules so that the granules only partially fill the pockets to maintain said compressibility to allow decoupling of the sound barrier layer from the sheet metal for improved isolation of noise, and wherein said bubble pack is adapted to be positioned in direct contact with the sheet metal component.

2. The vehicle acoustical system of claim 1, wherein said pockets comprise 0% by volume kinetic energy dissipating granules.

3. The vehicle acoustical system of claim 1, further comprising a third film layer configured to contain the granules away from the barrier layer and closely adjacent the sheet metal component.

4. The vehicle acoustical system of claim 1, wherein said pockets comprise sequentially varying heights for packaging and improved local decoupling.

5. The vehicle acoustical system of claim 1, wherein each said pocket comprises a bottom portion, and the system further comprises a third film layer secured to the bottom portion of each said pocket for added structural integrity.

6. The vehicle acoustical system of claim 1, wherein said pockets comprise a blow-molded structure.

7. The vehicle acoustical system of claim 1, wherein said pockets comprise a vacuum-formed structure.

* * * * *